United States Patent
Kim et al.

(10) Patent No.: US 10,375,757 B2
(45) Date of Patent: Aug. 6, 2019

(54) METHOD AND DEVICE FOR TERMINAL PERFORMING PDCCH MONITORING ON SCPTM

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/743,648

(22) PCT Filed: Aug. 10, 2016

(86) PCT No.: PCT/KR2016/008762
§ 371 (c)(1),
(2) Date: Jan. 10, 2018

(87) PCT Pub. No.: WO2017/026781
PCT Pub. Date: Feb. 16, 2017

(65) Prior Publication Data
US 2018/0206289 A1    Jul. 19, 2018

Related U.S. Application Data

(60) Provisional application No. 62/203,869, filed on Aug. 11, 2015.

(51) Int. Cl.
*H04W 76/28* (2018.01)
*H04W 76/20* (2018.01)
(Continued)

(52) U.S. Cl.
CPC .......... *H04W 76/28* (2018.02); *H04W 4/06* (2013.01); *H04W 24/08* (2013.01); *H04W 72/12* (2013.01);
(Continued)

(58) Field of Classification Search
None
See application file for complete search history.

(56) References Cited

U.S. PATENT DOCUMENTS

2009/0149164 A1    6/2009  Cai
2016/0227383 A1*   8/2016  Lin .................... H04W 4/08
(Continued)

FOREIGN PATENT DOCUMENTS

CN        102067636        5/2011

OTHER PUBLICATIONS

PCT International Application No. PCT/KR2016/008762, International Search Report dated Oct. 31, 2016, 6 pages.
(Continued)

*Primary Examiner* — Otis L Thompson, Jr.
(74) *Attorney, Agent, or Firm* — Lee Hong Degerman Kang Waimey

(57) ABSTRACT

Provided are a method for a terminal performing physical downlink control channel (PDCCH) monitoring for receiving a single-cell point-to-multipoint (SCPTM) service in a wireless communication system, and a device supporting same. A terminal may receive one or more SCPTM discontinuous reception (DRX) configuration for receiving a SCPTM service, and on the basis of the one or more SCPTM DRX configuration, perform PDCCH monitoring for receiving the SCPTM service.

13 Claims, 10 Drawing Sheets

(51) Int. Cl.
*H04W 4/06* (2009.01)
*H04W 24/08* (2009.01)
*H04W 72/12* (2009.01)
*H04W 48/12* (2009.01)
*H04W 76/40* (2018.01)

(52) U.S. Cl.
CPC ............ *H04W 76/20* (2018.02); *H04W 48/12* (2013.01); *H04W 76/40* (2018.02)

(56) References Cited

U.S. PATENT DOCUMENTS

| | | | |
|---|---|---|---|
| 2017/0201964 A1* | 7/2017 | Gupta | H04L 12/189 |
| 2017/0265166 A1* | 9/2017 | Hosseini | H04L 27/2601 |
| 2017/0339723 A1* | 11/2017 | Fujishiro | H04W 4/06 |
| 2018/0049006 A1* | 2/2018 | Hong | H04W 4/06 |
| 2018/0049060 A1* | 2/2018 | Fujishiro | H04W 4/06 |
| 2018/0167881 A1* | 6/2018 | Lee | H04W 52/0216 |

OTHER PUBLICATIONS

Asustek, "Configuration for SC-PTM transmission", 3GPP TSG RAN WG2 Meeting #90, R2-152272, May 2015, 5 pages.
Kyocera, "Consideration of DRX in SC-PTM transmission", 3GPP TSG RAN WG2 Meeting #90, R2-152636, May 2015, 6 pages.
Potevio, "Consideration of SC-PTM RNTI and SC-PTM configuration", 3GPP TSG RAN WG2 Meeting #90, R2-152697, May 2015, 5 pages.
Huawei, "TP on PHY aspects for SC-PTM", 3GPP TSG RAN WG2 Meeting #90, R2-152465, May 2015, 5 pages.
European Patent Office Application Serial No. 16835421.5, Search Report dated Mar. 7, 2019, 6 pages.
LG Electronics, "Reception of DL-SCH carrying MTCH", R2-154474, 3GPP TSG-RAN WG2 #91bis, Oct. 2015, 2 pages.

* cited by examiner (a)

(b)

METHOD AND DEVICE FOR TERMINAL PERFORMING PDCCH MONITORING ON SCPTM

BACKGROUND OF THE INVENTION

Field of the Invention

The present invention relates to a wireless communication system and, most particularly, to a method of a user equipment for monitoring a PDCCH for a SCPTM service and a device supporting the same.

Related Art

3rd Generation Partnership Project (3GPP) Long Term Evolution (LTE) that is an advancement of Universal Mobile Telecommunication System (UMTS) is being introduced with 3GPP release 8. In 3GPP LTE, orthogonal frequency division multiple access (OFDMA) is used for downlink, and single carrier-frequency division multiple access (SC-FDMA) is used for uplink. The 3GPP LTE adopts multiple input multiple output (MIMO) having maximum four antennas. Recently, a discussion of 3GPP LTE-Advanced (LTE-A) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain is not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

SUMMARY OF THE INVENTION

Technical Objects

Even though a SCPTM service is broadcasted, some of the SCPTM signals are required to be signaled through a PDCCH. Therefore, a user equipment is required to perform PDCCH monitoring for receiving a SCPTM service it is interested in. Therefore, a method of a user equipment for performing PDCCH monitoring for receiving a SCPTM service based on a new SCPTM DRX configuration and a device supporting the same should be proposed.

Technical Solutions

According to an exemplary embodiment of the present invention, provided herein is a method of a user equipment for performing PDCCH monitoring for receiving a Single-Cell Point-to-Multipoint (SCPTM) service in a wireless communication system. The user equipment may receive one or more SCPTM Discontinuous Reception (DRX) configurations for receiving a SCPTM service and may perform Physical Downlink Control Channel (PDCCH) monitoring for receiving the SCPTM service based on the one or more SCPTM DRX configurations.

The PDCCH monitoring may be performed during an On Duration period being configured by at least one SCPTM DRX configuration among the one or more SCPTM DRX configurations. The PDCCH monitoring may be performed by using one or more G-RNTIs corresponding to the one or more SCPTM DRX configurations.

The SCPTM DRX configuration may be acquired through SC-MCCH scheduling information being included in a System Information Block (SIB).

The SCPTM DRX configuration may be optionally received in accordance with a service in which the user equipment is interested.

The SCPTM DRX configuration may be broadcasted (or aired) by a network.

The SCPTM DRX configuration may be configured for each Multicast Traffic Channel (MTCH).

The SCPTM DRX configuration may be configured for each MTCH group.

The user equipment may further perform a step of receiving a legacy Discontinuous Reception (DRX) configuration for receiving a unicast service. Herein, the legacy DRX configuration may be configured to be independent from the one or more SCPTM DRX configurations. The user equipment may further perform a step of performing PDCCH monitoring for receiving the unicast service based on the DRX configuration.

The PDCCH may be addressed by the G-RNTI. Herein, the PDCCH may include a DCI corresponding to the SCPTM service. If the DCI includes a number of subframes, the PDCCH monitoring may be performed in continuous subframes corresponding to the number of subframes. If the DCI includes subframe scheduling information, the PDCCH monitoring may be performed in subframes corresponding to the subframe scheduling information. Herein, the subframe scheduling information may include bitmap information.

The user equipment may further perform a step of receiving one or more SCPTM services, in which the user equipment is interested, based on the PDCCH monitoring.

According to another exemplary embodiment of the present invention, a user equipment performing PDCCH monitoring for receiving a Single-Cell Point-to-Multipoint (SCPTM) service in a wireless communication system may include a memory, a transceiver, and a processor operatively connecting the memory to the transceiver. Herein, the processor may be configured to control the transceiver so as to receive one or more SCPTM Discontinuous Reception (DRX) configurations for receiving a SCPTM service, and to perform Physical Downlink Control Channel (PDCCH) monitoring for receiving the SCPTM service based on the one or more SCPTM DRX configurations.

Effects of the Invention

Based on a SCPTM DRX configuration, a SCPTM service may be discontinuously received.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
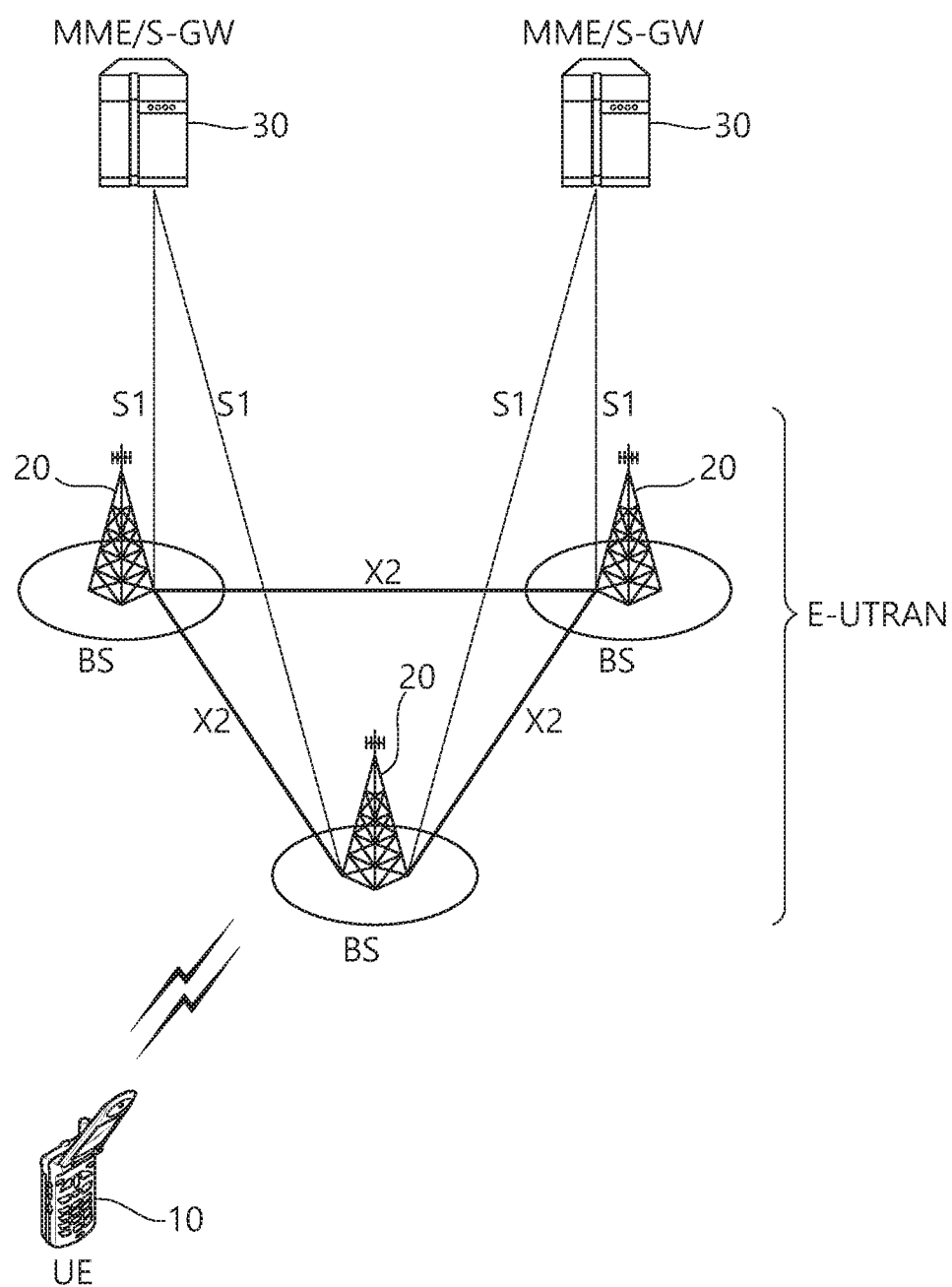
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
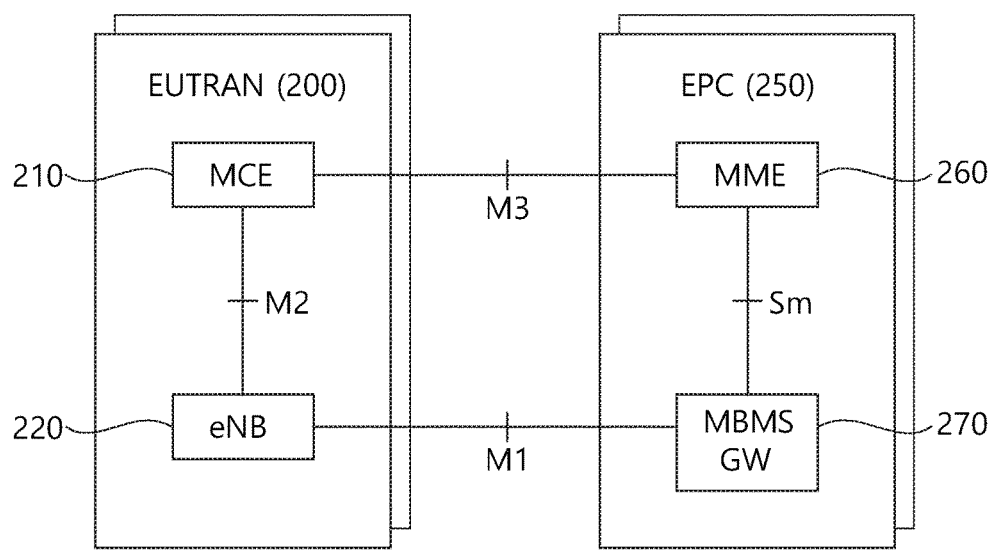
FIG. 2 shows a network architecture for an MBMS.

FIG. 2 shows a network architecture for a Multimedia Broadcast/Multicast Service (MBMS).

Referring to FIG. 2, the radio access network (EUTRAN) 200 includes a multi-cell coordination entity (hereinafter, "MCE") 210 and a base station (eNB) 220. The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The Evolved Packet Core (EPC) 250 includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
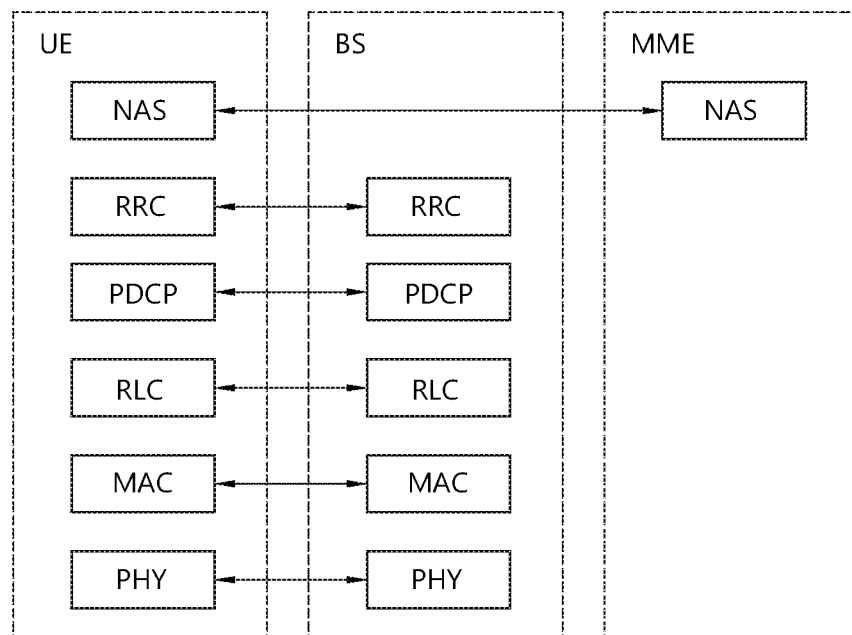
FIG. 3 shows a control plane and a user plane of a radio interface protocol of an LTE system.
Figure 3:
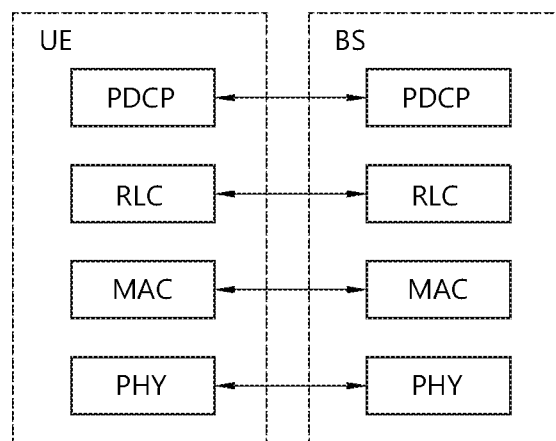

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, Discontinuous Reception (DRX) Will be Described in Detail.

Figure 4:
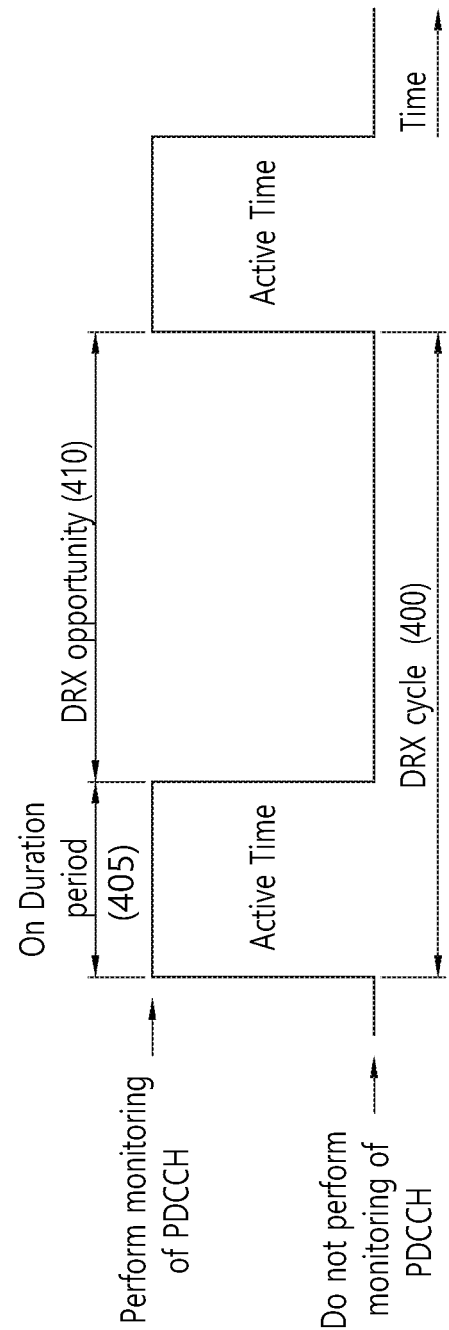
FIG. 4 shows an example of DRX operations.

FIG. 4 shows an example of DRX operations.

Referring to FIG. 4, the DRX operation is repeated in DRX cycle 400 units. The DRX cycle 400 is defined as a periodic repetition of an opportunity for DRX 410 and an On Duration 405. The DRX cycle 400 of one period includes an On Duration 405 and an opportunity for DRX 410. Herein, for example, a long DRX cycle being applied to a range of 10 subframes to 2560 subframes exists, and, as another example, a short DRX cycle being applied to a range of 2 subframes to 640 subframes exists. At this point, the short DRX cycle is applied only while a DRX Short Cycle Timer (drxShortCycleTimer) is being operated, and the long DRX cycle is applied outside of the operation range of the drxShortCycleTimer. Herein, a basic unit of the drxShortCycleTimer corresponds to one short DRX cycle. At this point, for example, a length of the drxShortCycleTimer may range from 1 to 16. In case the user equipment is being operated at a short DRX cycle, this may be referred to as a short DRX mode, and, in case the user equipment is being operated at a long DRX cycle, this may be referred to as a log DRX mode.

A RRC layer manages some of the timers in order to control the DRX operation. The timers controlling the DRX operation correspond to an "on Duration" Timer (onDurationTimer), a DRX Inactivity Timer (drxInactivity Timer), a DRX Retransmission Timer (drxRetransmission Timer), and so on.

The onDurationTimer starts when the DRX cycle starts. In other words, a start point of the onDurationTimer is the same as a start point of the DRX cycle. A value of the onDurationTimer is incremented by 1 at each PDCCH subframe. Thereafter, the onDurationTimer is expired when the onDurationTimer value reaches a predetermined expiration value. The onDurationTimer is effectively (or validly) operated until the onDurationTimer value reaches the expiration value.

The drxInactivity Timer may be defined as a number of continuous PDCCH subframes starting from a time point of successfully decoding a PDCCH for uplink or downlink user data transmission. Since continuous data reception may occur, this corresponds to a time period during which the user equipment is required to continuously monitor the PDCCH. The drxInactivity Timer is started or re-started when the user equipment has successfully decoded a PDCCH for an initial HARQ transmission.

The drxRetransmission Timer corresponds to a timer that operates based on a maximum value corresponding to a number of continuous PDCCH subframes that are expected to be immediately re-transmitted by the user equipment via downlink. The drxRetransmission Timer corresponds to a timer that starts in a case when the user equipment fails to receive re-transmission data even after an expiration of a HARQ RTT timer. While the drxRetransmission Timer is activated, the user equipment may monitor the reception of the re-transmitted data during a HARQ process. The configuration of the drxRetransmission Timer is defined in a MAC-MainConfig message of the RRC layer.

A time period during which the onDurationTimer, the drxInactivity Timer, or the drxRetransmission Timer are active (or being operated) is referred to as an active time. Alternatively, the active time also refer to all time periods during which the user equipment is in an awake state. During the DRX cycle, a time period that does not correspond to the active time may be referred to as a Non-active time. The active time may also be referred to as a Wake-up period, and the Non-active time may be referred to as a Sleep period. During the active time, the user equipment monitors the PDCCH for a PDCCH subframe. Herein, a PDCCH subframe refers to subframe including a PDCCH. For example, in a TDD configuration, downlink subframes and Downlink Pilot Time Slot (DwPTS) subframes correspond to the PDCCH subframe. A timer unit of DRX timers, such as the onDurationTimer, the drxInactivity Timer, or the drxRetransmission Timer corresponds to a PDCCH subframe (psf). More specifically, the DRX timers are counted based on a number of PDCCH subframes.

Additionally, other parameters controlling the DRX operation may include a long DRX cycle (longDRX-Cycle) and a DRX start offset (drxStartOffset). Herein, the base station may optionally (or selectively) configure a drxShortCycleTimer and a shortDRX-Cycle. Also, a HARQ round trip time (RTT) timer is defined for each downlink HARQ process.

The drxStartOffset corresponds to a value that determine a subframe from which the DRX cycle 400 starts. The drxShortCycleTimer corresponds to a timer defining a number of continuous subframe during which the UE should follow the shortDRX-Cycle. The HARQ RTT corresponds to a timer defining a minimum number of subframes before the period during which downlink HARQ re-transmission is expected to be performed by the user equipment.

Meanwhile, DRX configuration information may be received by being included in a MAC-MainConfig message, which corresponds to a RRC message being used for indicating the main configuration of a MAC layer for a signaling radio bearer (SRB) and a data radio bearer (DRB)

Hereinafter, an MBMS and a Multicast/Broadcast Single Frequency Network (MBSFN) are Described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns a highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned a highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Figure 5:
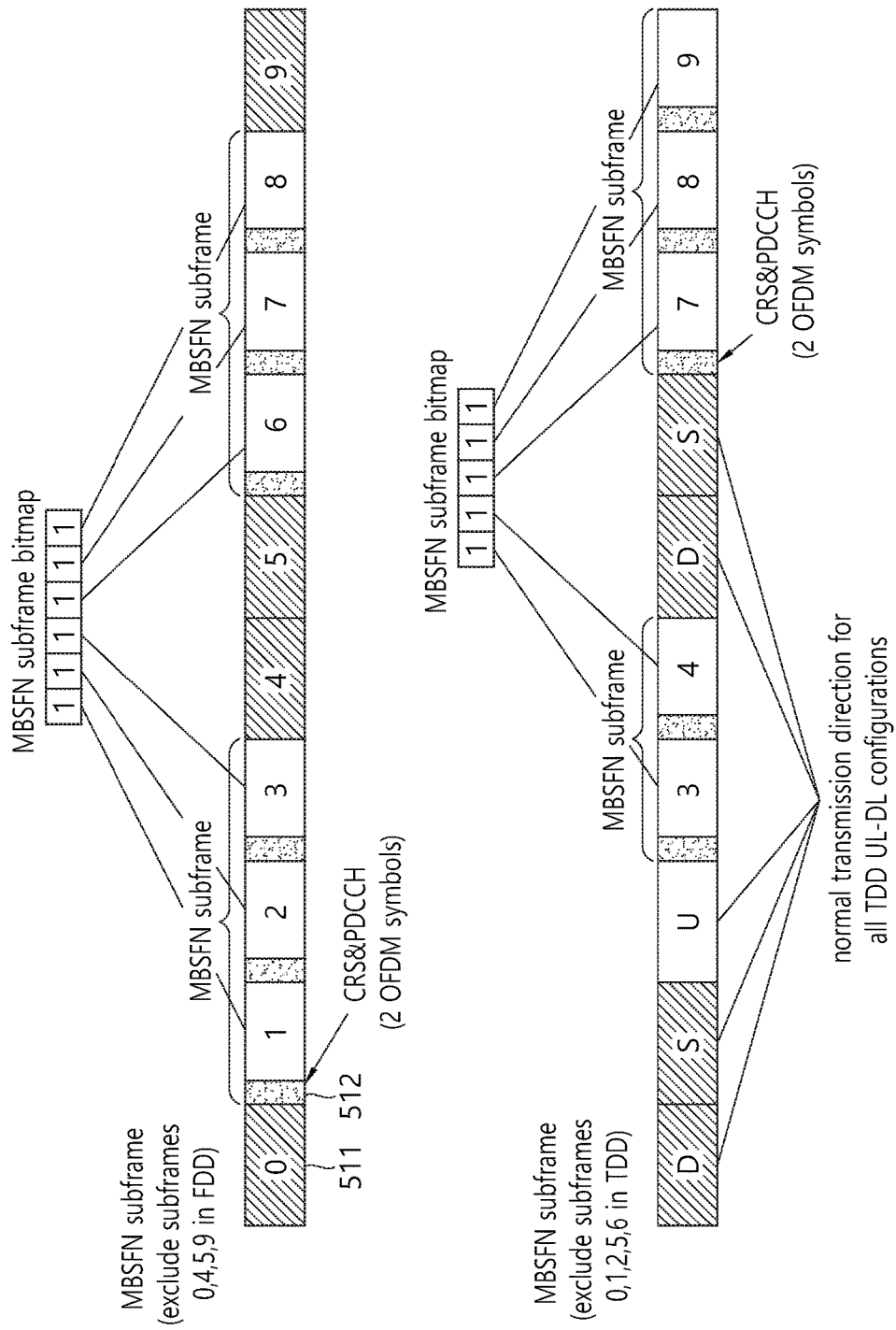
FIG. 5 shows a structure of an MBSFN subframe.

FIG. 5 shows a structure of an MBSFN subframe.

Referring to FIG. 5, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 511 uses a normal CP, a CRS according to the normal CP is also used in the first two OFDM symbols 512 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 6:
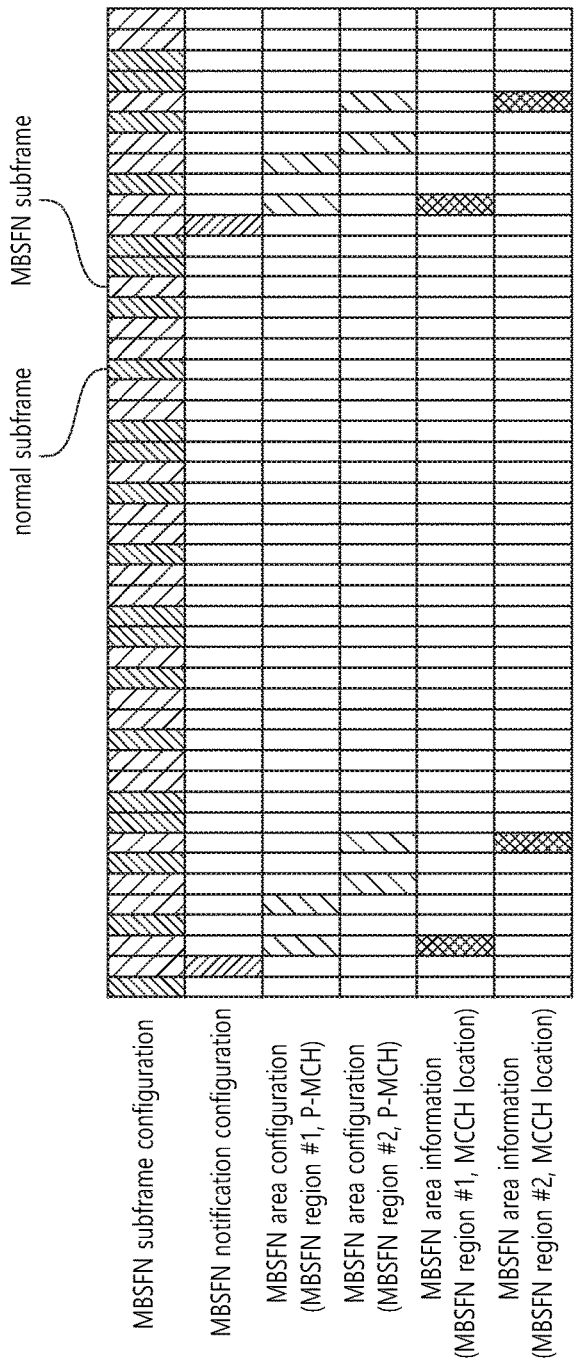
FIG. 6 shows an example of an MBSFN subframe configuration for performing an MBMS service.

FIG. 6 shows an example of an MBSFN subframe configuration for performing an MBMS service.

Referring to FIG. 6, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MB SFN region, the MB SFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Hereinafter, Single-Cell Point-to-Multipoint (SCPTM) Transmission is Described.

A transmission method of an MBMS service includes SCPTM transmission and multimedia broadcast multicast service single frequency network (MBSFN) transmission. While identifiable signals are transmitted simultaneously in a plurality of cells in the MBSFN transmission, the MBMS service is transmitted in a single cell in the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is determined that a service desired by the UE is an SCPTM service through the MCCH, the UE may acquire a corresponding RNTI value and read a PDCCH through a corresponding RNTI to receive the SCPTM service.

Currently, the MBMS configuration signal is broadcasted (or on air or aired). Conversely, in case of the SCPTM transmission, part of the SCPTM configuration signals are broadcasted through the PDSCH. However, another part of the SCPTM configuration signals are required to be broadcasted through the PDCCH. Therefore, in order to receive a SCPTM service in which the user equipment is interested, the user equipment is required to monitor the PDCCH. Hereinafter, according to an exemplary embodiment of the present invention, a method of a user equipment for performing PDCCH monitoring for receiving a SCPTM service and a device supporting the same will be described in detail.

In order to allow the user equipment to receive a SCPTM service, a MTCH for SCPTM and a MCCH for SCPTM are required to be newly defined. The MTCH for SCPTM may correspond to a SC-MTCH, and a MCCH for SCPTM may correspond to a SC-MCCH.

One SC-MCCH may exist for each cell. The SC-MCCH may be transmitted over a DL-SCH. The SC-MCCH may provide a list of all MBMS services to a session being in process, which is transmitted over the SC-MTCH. The list may include each MBMS service TMGI and additional session ID, associated G-RNTI, and scheduling information. The SC-MCCH may be transmitted by the RRC during all SC-MCCH repetition cycle periods. The SC-MCCH may use varied cycle periods. A notification mechanism may be used for notifying a change in the SC-MCCH caused by a start of a session. The notification may be transmitted from a first subframe of a repetition cycle period to which the SC-MCCH may be scheduled. The notification may be transmitted by using a DCI 1C format and 1 bit of an 8-bit bitmap of an SC-N-RNTI. When the user equipment received the notification, the user equipment may acquire the SC-MCCH from the same subframe.

When the user equipment receives a PDSCH that carries an MTCH for the SCPTM, the user equipment may monitor a PDCCH that is addressed by a SCPTM-specific RNTI or M-RNTI. The MTCH for the SCPTM may correspond to a SC-MTCH. The PDCCH may be monitored by a new SCPTM DRX configuration that is specified to the SCPTM.

In case the user equipment is in a RRC_CONNECTED state, the user equipment may monitor the PDCCH in accordance to not only the legacy DRX configuration but also to the one or more new SCPTM DRX configurations. The legacy DRX configuration may include a legacy DRX cycle and/or a legacy DRX timer. The new SCPTM DRX configurations may include a SCPTM-specific DRX cycle and/or a SCPTM-specific DRX timer.

The new SCPTM configuration may be provided for each Temporary Mobile Group Identifier (TMGI). The new SCPTM configuration may be provided for each TMGI group. And, the TMGI group may correspond to a group of MBMS services. The new SCPTM configuration may be provided for each MTCH. The new SCPTM configuration may be provided for each MTCH group. And, the MTCH group may correspond to a group of MTCH channels. The new SCPTM configuration may be provided for each DSCH. The new SCPTM configuration may be provided for each DSCH group. And, the DSCH group may correspond to a group of DSCH channels. The new SCPTM configuration may be provided for each PDSCH. The PDSCH may carry the MTCH. The new SCPTM configuration may be provided for each PDSCH group. And, the PDSCH group may correspond to a group of DSCH channels.

In case the user equipment is in a RRC_IDLE state, the user equipment may receive a SCPTM transmission. In case of the user equipment receiving the SCPTM transmission, the user equipment may monitor the PDCCH in accordance with the SCPTM DRX configuration corresponding to the TMGI in which the user equipment is interested.

The SCPTM-specific RNTI may correspond to any one of a G-RNTI being mapped to the TMGI, a new RNTI that is specified to the MCCH for the SCPTM, and a new RNTI that is specified an SCPTM scheduling information MAC control element. The MCCH for the SCPTM may correspond to a SC-MCCH.

When a G-RNTI that is mapped to the TMGI, in which the user equipment is interested, the user equipment may decode the PDSCH in order to receive a MAC PDU. The MAC PDU may include a MAC SDU within a MTCH being mapped to the TMGI, in which the user equipment is interested.

Figure 7:
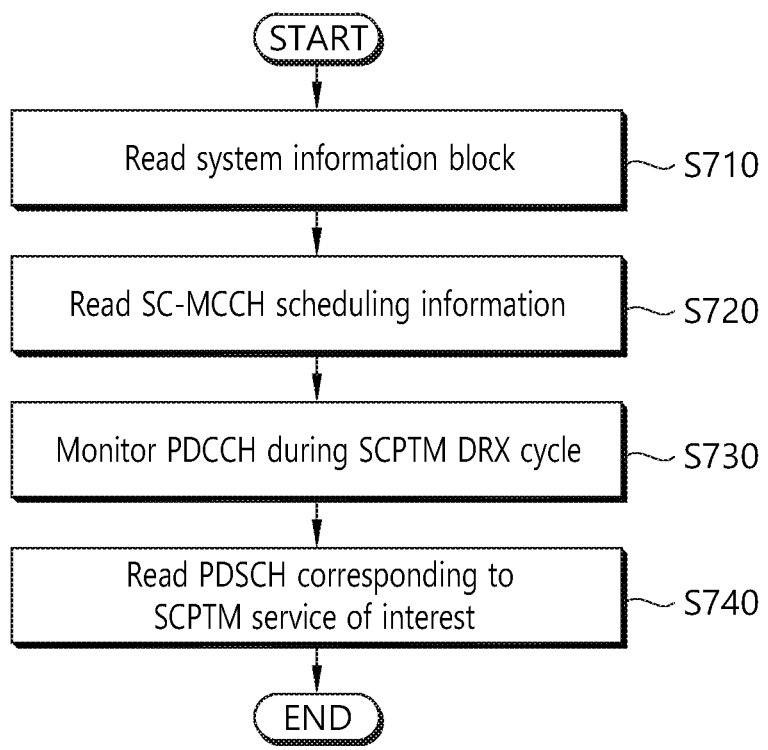
FIG. 7 shows a method of a user equipment for performing PDCCH monitoring for receiving a SCPTM service according to an exemplary embodiment of the present invention.

FIG. 7 shows a method of a user equipment for performing PDCCH monitoring for receiving a SCPTM service according to an exemplary embodiment of the present invention.

(1) In step S710, the user equipment may read a system information block (SIB). The SIB may correspond to a new SIB associated with the SCPTM. Alternatively, the SIB may also correspond to SIB20 including information on the SCPTM. The SIB may include SC-MCCH scheduling information. The SC-MCCH scheduling information may correspond to MCCH scheduling information for the SCPTM.

(2) In step S720, the user equipment may read a SC-MCCH. The SC-MCCH may include at least any one of a TMGI list, a Logical Channel Identity (ID) per TMGI information, TMGI to G-RNTI mapping information per TMGI, SCPTM DRX configuration, and scheduling cycle period for 'SCPTM scheduling information MAC CE'.

Hereinafter, the SCPTM DRX configuration will be described in detail.

The user equipment may separately apply DRX configuration for SCPTM reception and DRX configuration for unicast reception. The DRX configuration for SCPTM reception may also be referred to as a SCPTM DRX configuration, and the DRX configuration for unicast reception may also be referred to as a legacy DRX configuration or DRX configuration. The SCPTM DRX configuration and the legacy DRX configuration may be configured to be independent from one another.

The SCPTM DRX configuration may be configured for each TMGI. Alternatively, the SCPTM DRX configuration may be identically configured for all TMGIs within the corresponding cell.

The SCPTM DRX configuration may include at least one of a Corresponding TMGI identity (ID), an onDurationTimer, a drx-InactivityTimer, a drx-RetransmissionTimer, and SCPTM DRX cycle information. When the DRX is configured for each TMGI, the Corresponding TMGI ID may be included in the SCPTM DRX configuration. The SCPTM DRX cycle information may indicate when the user equipment is required to wake up in order to receive an SCPTM transmission in accordance with the SCPTM DRX cycle. The SCPTM DRX cycle may correspond to any one of a single cycle or multiple cycles. For example, a long SCPTM DRX cycle and a short SCPTM DRX cycle may be respectively similar to the legacy long DRX cycle and the legacy short DRX cycle. If a long SCPTM DRX cycle and a short SCPTM DRX cycle exist, at least one of a longDRX-CycleStartOffset, a shortDRX-Cycle, and a drxShortCycleTimer may be considered as the SCPTM DRX cycle information.

A network may provide one or more SCPTM DRX configurations in a corresponding cell. For example, the SCPTM DRX configuration may be provided for each Temporary Mobile Group Identifier (TMGI). The SCPTM DRX configuration may be provided for each TMGI group. And, the TMGI group may correspond to a group of MBMS services. The SCPTM DRX configuration may be provided for each MTCH. The SCPTM DRX configuration may be provided for each MTCH group. And, the MTCH group may correspond to a group of MTCH channels. The SCPTM DRX configuration may be provided for each DSCH. The SCPTM DRX configuration may be provided for each DSCH group. And, the DSCH group may correspond to a group of DSCH channels. The SCPTM DRX configuration may be provided for each PDSCH. The PDSCH may carry the MTCH. The SCPTM DRX configuration may be provided for each PDSCH group. And, the PDSCH group may correspond to a group of DSCH channels. Table 1 shown below shows an example of the SCPTM DRX configuration being provided for each MTCH.

TABLE 1

```
SC-MTCH-SchedulingInfo-r13:: =   SEQUENCE {
  onDurationTimerSCPTM-r13         ENUMERATED {
                                     psf1, psf2, psf3, psf4, psf5, psf6,
                                     psf8, psf10, psf20, psf30, psf40,
                                     psf50, psf60, psf80, psf100,
                                     psf200},
  drx-InactivityTimerSCPTM-r13     ENUMERATED {
                                     psf0, psf1, psf2, psf4, psf8,
                                     psf10, psf20, psf40,
                                     psf80, psf160, ps320,
                                     psf640, psf960,
                                     psf1280, psf1920, psf2560},
  schedulingPeriodStartOffsetSCPTM-r13 CHOICE {
    sf10                             INTEGER(0...9),
    sf20                             INTEGER(0..19),
    sf32                             INTEGER(0..31),
    sf40                             INTEGER(0..39),
    sf64                             INTEGER(0..63),
    sf80                             INTEGER(0..79),
    sf128                            INTEGER(0..127),
    sf160                            INTEGER(0..159),
    sf256                            INTEGER(0..255),
```

TABLE 1-continued

```
    sf320                            INTEGER(0..319),
    sf512                            INTEGER(0..511),
    sf640                            INTEGER(0..639),
    sf1024                           INTEGER(0..1023),
    sf2048                           INTEGER(0..2048),
    sf4096                           INTEGER(0..4096),
    sf8192                           INTEGER(0..8192)
  },
  ...
}
```

(3) In step S730, the user equipment may monitor a PDCCH during a SCPTM DRX cycle. The PDCCH may be monitored during an onDuration period of the SCPTM DRX cycle. The SCPTM DRX cycle may be configured in accordance with the SCPTM DRX configuration.

In case one or more SCPTM DRX cycles are configured, the user equipment may monitor the PDCCH from any one the SCPTM DRX cycles of the onDuration period among the one or more SCPTM DRX cycles. The PDCCH monitoring may be performed by using one or more G-RNTIs corresponding to one or more SCPTM DRX configurations. For example, in case a plurality of SCPTM DRX cycles are configured, the plurality of PDCCH monitoring sessions may each be performed by a different G-RNTI. According to an exemplary embodiment of the present invention, it will be assumed that the user equipment is interested in a first TMGI and a second TMGI, and that an onDuration period of the first TMGI and an onDuration period of the second TMGI do not overlap with one another. In this case, the user equipment may monitor the PDCCH by using a first G-RNTI during the onDuration period of the first TMGI, and the user equipment may monitor the PDCCH by using a second G-RNTI during the onDuration period of the second TMGI. According to another exemplary embodiment, it will be assumed that the user equipment is interested in a first TMGI and a second TMGI, and that an onDuration period of the first TMGI and an onDuration period of the second TMGI overlap with one another. In this case, the user equipment may monitor the PDCCH by using a first G-RNTI and a second G-RNTI during the onDuration period of the first TMGI and the onDuration period of the second TMGI.

In step S730, in case the user equipment is in the RRC_CONNECTED state, in addition to the legacy DRX procedure, the user equipment that is interested in the reception of the SCPTM service may perform a SCPTM-specific DRX procedure in accordance with the SCPTM DRX configuration. More specifically, in case the user equipment is in the RRC_CONNECTED state, the user equipment that is interested in the reception of the SCPTM service may perform at least two or more independent DRX procedures in accordance with different DRX configurations.

In step S730, a SCPTM DRX cycle may be configured for each Temporary Mobile Group Identifier (TMGI). The SCPTM DRX cycle may be configured for each TMGI group. And, the TMGI group may correspond to a group of MBMS services. The SCPTM DRX cycle may be configured for each MTCH. The SCPTM DRX cycle may be configured for each MTCH group. And, the MTCH group may correspond to a group of MTCH channels. The SCPTM DRX cycle may be configured for each DSCH. The SCPTM DRX cycle may be configured for each DSCH group. And, the DSCH group may correspond to a group of DSCH channels. The SCPTM DRX cycle may be configured for each PDSCH. The PDSCH may carry the MTCH. The SCPTM DRX cycle may be configured for each PDSCH group. And, the PDSCH group may correspond to a group of DSCH channels.

In step S730, the PDCCH may be addressed by a G-RNTI (Option 1). In step S730, the PDCCH may be addressed by a SC-RNTI (Option 2). Hereinafter, Option 1 and Option 2 will be described in more detail.

1) Option 1: PDCCH addressed by G-RNTI

A G-RNTI may be mapped to a TMGI. For example, when a user equipment is interested in two different types of multicast services, with the exception for the legacy C-RNTI, two different types of SCPTM RNTIs may be configured to the user equipment.

The user equipment may monitor the PDCCH, which is addressed by the G-RNTI in accordance with the SCPTM DRX configuration. The PDCCH may include a DCI for the SCPTM. A CRC that is attached (i.e., attached CRC) to the DCI of the SCPTM service may be masked with the G-RNTI. The DCI may include SCPTM subframe scheduling information. The SCPTM subframe scheduling information may indicate subframes that require additional PDCCH monitoring.

The subframes that require additional PDCCH monitoring may correspond to continuous subframes. The continuous subframes may be indicated by a number of subframes. The continuous subframe may be indicated by a bitmap. For example, if the DCI includes a number of continuous SCPTM subframes, the user equipment may monitor the continuous PDCCH that is addressed by the G-RNTI in the subframe, which is indicated by the DCI, during the SCPTM DRX cycle.

The subframes that require additional PDCCH monitoring may correspond to non-continuous subframes. The non-continuous subframe may be indicated by a bitmap. For example, if the DCI includes SCPTM subframe scheduling information, the user equipment may monitor the indicated PDCCH that is addressed by the G-RNTI in the subframe, which is indicated by the DCI, during the SCPTM DRX cycle. The SCPTM subframe scheduling information may correspond to non-continuous PDSCH subframe scheduling information.

Figure 8:
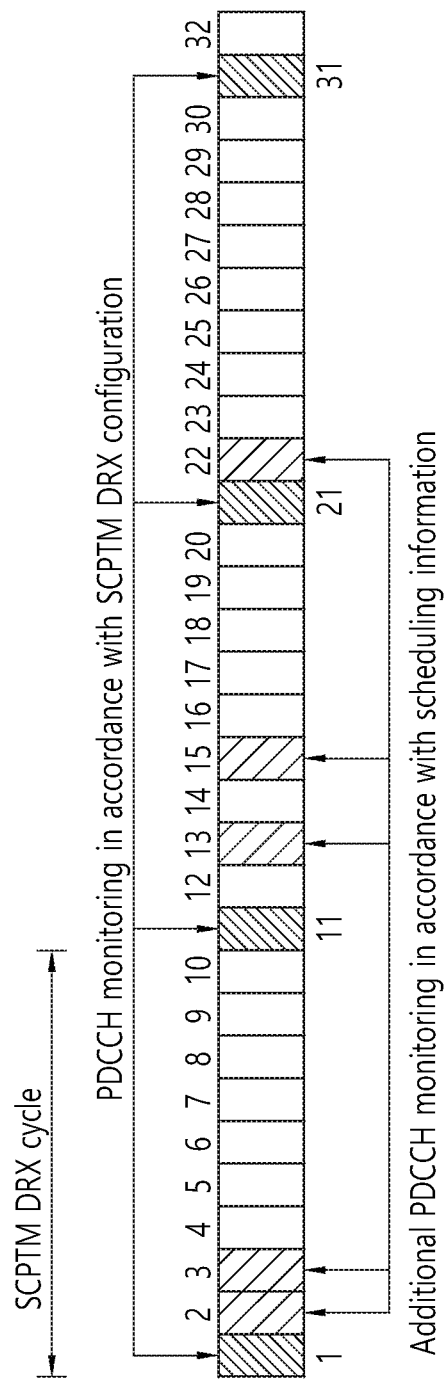
FIG. 8 shows a method for indicating a SCPTM subframe for additional PDCCH monitoring according to an exemplary embodiment of the present invention.

FIG. 8 shows a method for indicating a SCPTM subframe for additional PDCCH monitoring according to an exemplary embodiment of the present invention.

Referring to FIG. 8, the user equipment may monitor the PDCCH in a first subframe (Subframe 1), an $11^{th}$ subframe (Subframe 11), a $21^{st}$ subframe (Subframe 21), and a $31^{st}$ subframe (Subframe 31). The PDCCH may be addressed by the G-RNTI.

The PDCCH being monitored in the first subframe (Subframe 1) may be included in a DCI for SCPTM. The DCI may include the SCPTM subframe scheduling information, and the SCPTM subframe scheduling information may indicate that additional monitoring of the PDCCH is required in a second subframe (Subframe 2) and a third subframe (Subframe 3). The subframe scheduling information may include the number of continuous subframes (e.g., 2 subframes) that require additional PDCCH monitoring. The subframe scheduling information may include bitmap information of the subframes that require additional PDCCH monitoring.

The PDCCH being monitored in the $11^{th}$ (Subframe 11) may be included in a DCI for SCPTM. The DCI may include the SCPTM subframe scheduling information, and the SCPTM subframe scheduling information may indicate that additional monitoring of the PDCCH is required in a $13^{th}$ subframe (Subframe 13) and a $15^{th}$ subframe (Subframe 15). The subframe scheduling information may include bitmap information of the subframes that require additional PDCCH monitoring. Herein, the $13^{th}$ subframe (Subframe 13) and the $15^{th}$ subframe (Subframe 15) may be indicated by the bitmap information.

The PDCCH being monitored in the $21^{st}$ subframe (Subframe 21) may be included in a DCI for SCPTM. The DCI may include the SCPTM subframe scheduling information, and the SCPTM subframe scheduling information may indicate that additional monitoring of the PDCCH is required in a $22^{nd}$ subframe (Subframe 22). The subframe scheduling information may include the number of continuous subframes (e.g., 1 subframe) that require additional PDCCH monitoring. The subframe scheduling information may include bitmap information of the subframes that require additional PDCCH monitoring. Herein, the $22^{nd}$ subframe (Subframe 22) may be indicated by the bitmap information.

Option 2: PDCCH Addressed by SC-RNTI

A SC-RNTI may be mapped to a 'SCPTM Scheduling Information (Info) MAC CE'.

The user equipment may monitor the PDCCH, which is addressed by the SC-RNTI in accordance with the SCPTM DRX configuration. After the user equipment receives the PDCCH, which is addressed by the SC-RNTI, the user equipment may acquire the SCPTM Scheduling Information MAC CE through the PDSCH. Herein, by acquiring the SCPTM Scheduling Information MAC CE, the user equipment may acquire subframe scheduling information. The user equipment may monitor the PDCCH that is addressed by the SC-RNTI in the subframe, which is indicated by the SCPTM Scheduling Information MAC CE, during the SCPTM DRX cycle.

(4) In step S740, the user equipment may read a PDSCH corresponding to a SCPTM service in which the user equipment is interested. For example, in step S730, if the user equipment detects a G-RNTI for the SCPTM service, in which the user equipment is interested, from the PDCCH, the user equipment may read a PDSCH corresponding to the SCPTM service, in which the user equipment is interested. The user equipment may receive the SCPTM service in which it is interested.

Figure 9:
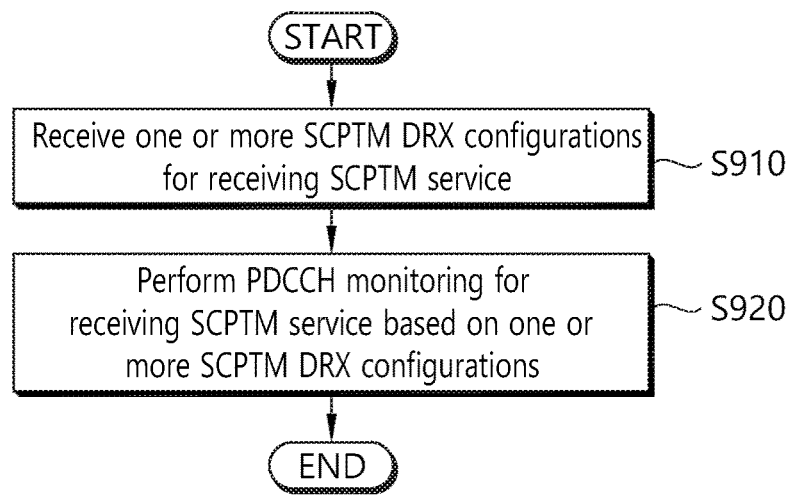
FIG. 9 is a block view showing a method of a user equipment for performing PDCCH monitoring for receiving a SCPTM service according to an exemplary embodiment of the present invention.

FIG. 9 is a block view showing a method of a user equipment for performing PDCCH monitoring for receiving a SCPTM service according to an exemplary embodiment of the present invention.

Referring to FIG. 9, in step S910, the user equipment may receive one or more SCPTM DRX configurations for receiving a SCPTM service. The SCPTM DRX configuration may be acquired through SC-MCCH scheduling information, which is included in a system information block. The SCPTM DRX configuration may be optionally (or selectively) received in accordance with services in which the user equipment is interested. The SCPTM DRX configuration may be broadcasted (or aired) by the network. The SCPTM DRX configuration may be configured for each TMGI. The SCPTM DRX configuration may be configured for each MTCH. The SCPTM DRX configuration may be configured for each MTCH group.

In step S920, the user equipment may perform PDCCH monitoring for receiving the SCPTM service based on the one or more SCPTM DRX configurations. The PDCCH monitoring may be performed during an On Duration period, which is configured by at least one SCPTM DRX configuration among the one or more SCPTM DRX configurations. The PDCCH monitoring may be performed by using one or more G-RNTIs corresponding to the one or more SCPTM DRX configurations.

The PDCCH may be addressed by the G-RNTI, and the PDCCH may include a DCI for the SCPTM service. If the DCI includes the number of subframes, the PDCCH monitoring may be performed in continuous subframes corresponding to the number of subframes. If the DCI includes subframe scheduling information, the PDCCH monitoring may be performed in subframes corresponding to the subframe scheduling information. The subframe scheduling information may include bitmap information.

The user equipment may receive one or more SCPTM services, in which the user equipment is interested, based on the PDCCH monitoring.

The user equipment may receive the legacy DRX configuration for receiving a unicast service. The legacy DRX configuration may be configured to be independent from the one or more SCPTM DRX configurations. The user equipment may perform PDCCH monitoring for receiving the unicast service based on the DRX configuration.

Figure 10:
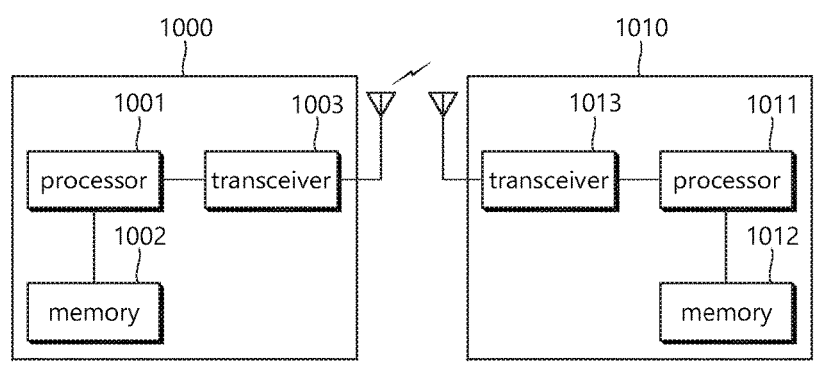
FIG. 10 is a block diagram illustrating a wireless communication system according to the embodiment of the present invention.

FIG. 10 is a block diagram illustrating a wireless communication system according to the embodiment of the present invention.

A BS 1000 includes a processor 1001, a memory 1002, and a transceiver 1003. The memory 1002 is connected to the processor 1001, and stores various information for driving the processor 1001. The transceiver 1003 is connected to the processor 1001, and transmits and/or receives radio signals. The processor 1001 implements proposed functions, processes and/or methods. In the above embodiment, an operation of the base station may be implemented by the processor 1001.

A UE 1010 includes a processor 1011, a memory 1012, and a transceiver 1013. The memory 1012 is connected to the processor 1011, and stores various information for driving the processor 1011. The transceiver 1013 is connected to the processor 1011, and transmits and/or receives radio signals. The processor 1011 implements proposed functions, processes and/or methods. In the above embodiment, an operation of the UE may be implemented by the processor 1011.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), PDCCH monitoring for receiving a Single-Cell Point-to-Multipoint (SCPTM) service in a wireless communication system, the method comprising:
receiving one or more SCPTM Discontinuous Reception (DRX) configurations for receiving a SCPTM service;
receiving a legacy DRX configuration for receiving a unicast service; and
performing Physical Downlink Control Channel (PDCCH) monitoring for receiving the SCPTM service based on the one or more SCPTM DRX configurations,
wherein the SCPTM DRX configuration is configured for each Multicast Traffic Channel (MTCH), and
wherein the legacy DRX configuration is configured to be independent from the one or more SCPTM DRX configurations.

2. The method of claim 1, wherein the PDCCH monitoring is performed during an on duration period which is configured by at least one SCPTM DRX configuration among the one or more SCPTM DRX configurations.

3. The method of claim 2, wherein the PDCCH monitoring is performed based on one or more G-RNTIs related to the one or more SCPTM DRX configurations.

4. The method of claim 1, wherein the SCPTM DRX configuration is acquired through SC-MCCH scheduling information which is included in a System Information Block (SIB).

5. The method of claim 1, wherein the SCPTM DRX configuration is optionally received based on a service in which the UE is interested.

6. The method of claim 1, wherein the SCPTM DRX configuration is configured for each MTCH group.

7. The method of claim 1, further comprising:
performing, by the UE, PDCCH monitoring for receiving the unicast service based on the legacy DRX configuration.

8. The method of claim 1,
wherein the PDCCH is addressed by a G-RNTI, and
wherein the PDCCH includes a DCI related to the SCPTM service.

9. The method of claim 8, wherein, if the DCI includes a number of subframes, the PDCCH monitoring is performed in continuous subframes related to the number of subframes.

10. The method of claim 8, wherein, if the DCI includes subframe scheduling information, the PDCCH monitoring is performed in subframes related to the subframe scheduling information.

11. The method of claim 10, wherein the subframe scheduling information includes bitmap information.

12. The method of claim 1, further comprising:
receiving, by the UE, one or more SCPTM services, in which the UE is interested, based on the PDCCH monitoring.

13. A user equipment performing PDCCH monitoring for receiving a Single-Cell Point-to-Multipoint (SCPTM) service in a wireless communication system, comprising:
- a memory; a transceiver; and
- a processor, operatively connecting the memory to the transceiver, that:
- controls the transceiver to receive one or more SCPTM Discontinuous Reception (DRX) configurations for receiving a SCPTM service,
- controls the transceiver to receive a legacy DRX configuration for receiving a unicast service, and
- performs Physical Downlink Control Channel (PDCCH) monitoring for receiving the SCPTM service based on the one or more SCPTM DRX configurations,
- wherein the SCPTM DRX configuration is configured for each Multicast Traffic Channel (MTCH), and
- wherein the legacy DRX configuration is configured to be independent from the one or more SCPTM DRX configurations.

\* \* \* \* \*